United States Patent [19]

Kobayashi et al.

[11] Patent Number: 4,823,001
[45] Date of Patent: Apr. 18, 1989

[54] METHOD OF MEASURING THE AMOUNT OF MOVEMENT OF AN OBJECT HAVING UNIFORMLY PERIODIC STRUCTURE

[75] Inventors: Hiroshi Kobayashi, 3-15 Hanakoganei, Kodaira-shi, Tokyo; Haruhiko Machida, 10-7 Nakaochiai 4-chome, Shinjuki-ku, Tokyo; Hideaki Ema, Shizuoka; Jun Akedo, Tokyo, all of Japan

[73] Assignees: Ricoh Company, Ltd.; Hiroshi Kobayashi; Haruhiko Machida, all of Tokyo, Japan

[21] Appl. No.: 86,942

[22] Filed: Aug. 17, 1987

[30] Foreign Application Priority Data

Aug. 15, 1986 [JP] Japan .................. 61-191455

[51] Int. Cl.⁴ .............................................. G01D 5/34
[52] U.S. Cl. ........................... 250/231 SE; 250/237 G
[58] Field of Search ............ 250/231 SE, 237 G, 550; 340/347 P; 356/395, 373, 374, 375; 324/174; 33/125 C

[56] References Cited

U.S. PATENT DOCUMENTS

| | | | |
|---|---|---|---|
| 3,879,136 | 4/1975 | Takeda | 250/231 SE |
| 4,218,615 | 8/1980 | Zinn, Jr. | 250/231 SE |
| 4,528,448 | 7/1985 | Doggett | 250/237 G |
| 4,629,886 | 12/1986 | Akiyama et al. | 250/237 G |
| 4,668,862 | 5/1987 | Waibel | 250/231 SE |

OTHER PUBLICATIONS

Halliday and Resnick, *Fundamentals of Physics*, John Wiley and Sons, 1974, p. 708.

*Primary Examiner*—David C. Nelms
*Attorney, Agent, or Firm*—Oblon, Fisher, Spivak, McClelland & Maier

[57] ABSTRACT

An object to be measured for the amount of movement thereof has a uniformly periodic structure. The object is illuminated with divergent light emitted from a coherent spot light source. By positionally adjusting the spot light source, the object, and a light sensor, an enlarged shadow-picture-like diffraction pattern of the uniformly periodic structure is generated at a position in which the light sensor is disposed. The shadow-picture-like diffraction pattern is moved when the object is moved across the divergent light from the spot light source. The amount of movement of the shadow-picture-like diffraction pattern is detected by the light sensor for thereby measuring the amount of movement of the object.

9 Claims, 7 Drawing Sheets

FIG. 6
$\varphi_0 = \pi$

FIG. 7
$\varphi_0 = \dfrac{\pi}{2}$

FIG. 8 $\varphi_0 = \frac{\pi}{3}$

FIG. 9 $\varphi_0 = \frac{2}{3}\pi$

FIG. 10 $\varphi_0 = \frac{\pi}{4}$

FIG. 11

$\varphi_0 = \frac{3}{4}\pi$

FIG. 12

$\varphi_0 = \frac{1}{5}\pi$

FIG. 13

$\varphi_0 = \frac{4}{5}\pi$

FIG. 14

$\varphi_0 = \frac{5}{6}\pi$

FIG. 15

$\varphi_0 = \frac{10}{7}\pi$

METHOD OF MEASURING THE AMOUNT OF MOVEMENT OF AN OBJECT HAVING UNIFORMLY PERIODIC STRUCTURE

BACKGROUND OF THE INVENTION

1. Field of the Invention

The present invention relates generally to a method of measuring the amount of movement, or displacement, of an object having a uniformly periodic structure and more particularly to a method of measuring the amount of movement of an object for use in various encoders or tracking control or seek control in optical disk systems.

2. Discussion of Background

There is known an optical measuring system for measuring a physical quantity of an object which applies light from a light source to the object and detects light reflected from or transmitted through the object with a sensor.

SUMMARY OF THE INVENTION

It is an object of the present invention to provide a novel method of optically measuring the amount of movement, or displacement, of an object.

According to the present invention, the amount of movement, or displacement, of an object is measured among various physical quantities thereof. The object to be measured is of a uniformly periodic structure. The term "uniformly periodic structure" used herein means that an optical property of the object, such as refractive index, reflectivity, absorptivity, or the like, repeatedly varies at a uniform period or pitch. Examples of the uniformly periodic structure may include the scale in a linear encoder or the code disk in a rotary encoder. Further, an optical information storage disk may also be one example of the uniformly periodic structure since an optical property thereof varies at a uniform period in the radial direction because of an array of information tracks. The uniform period referred to above is small enough to be able to cause applied light to produce distinct diffraction.

Divergent rays of light are applied from a coherent spot light source to the object. The coherent spot light source means that the light emitted therefrom has a certain fixed wavelength, and that the area of the light-emitting surface of the light source is so small that it can be regarded as a spot light source with respect to the pitch of the uniformly periodic structure of the object.

Specific examples of such a coherent spot light source may include collected light emitted from a laser source and converged by a lens, a semiconductor laser, or a pinhole disposed in the collected light or the light-emitting area of the semiconductor laser.

One preferred coherent spot light source that can be employed in the present invention is a masked semiconductor laser disclosed in U.S. patent application filed July 29, 1987, (Kobayashi et al., U.S. patent application Ser. No. 07/080,389) and assigned to the same assignee as the assignee of the present application. The masked semiconductor laser has a masking layer deposited on the light-emitting surface of a semiconductor laser for shutting off light emitted therefrom. The masking layer has a localized area removed or made transparent by the energy of light emitted by the semiconductor laser itself, thus forming a pinhole. Therefore, the masked semiconductor layer has a mask with a pinhole.

The object, the spot light source, and a light sensor which detects light reflected from or transmitted through the object are positionally adjusted relative to each other to produce an enlarged shadow-picture-like diffraction pattern corresponding to the uniformly periodic structure at the position of the light sensor. The shadow-picture-like diffraction pattern is of course generated by the light reflected from or transmitted through the object.

The shadow-picture-like diffraction pattern is a unique diffraction pattern that is generated when the spot light source, the object, and the plane on which the pattern is produced meet a prescribed positional relationship. This positional relationship is determined by the wavelength of the divergent light and the pitch of the uniformly periodic structure. The shadow-picture-like diffraction pattern itself has a uniformly periodic structure which corresponds to the uniformly periodic structure of the object.

Some diffraction patterns are called a shadow-picture-like diffraction pattern because it coincides with a shadow-picture-like pattern which would be produced as if an object were illuminated with light from a spot light source.

The presence of a shadow-picture-like diffraction pattern was heretofore not known at all, but has been confirmed theoretically and experimentally by the inventors for the first time.

When the object is moved in a direction transverse to the illuminating light while a shadow-picture-like diffraction pattern is being generated, the shadow-picture-like diffraction pattern is also moved on the plane on which it is formed. Since the shadow-picture-like diffraction pattern is of an enlarged size, the speed of movement thereof can be obtained by multiplying the speed of movement of the object by the enlarging magnification, i.e., the ratio between the distance from the spot light source to the plane on which the pattern is generated or the light sensor and the distance from the spot light source to the object.

By positioning the light sensor on the plane on which the shadow-picture-like diffraction pattern is produced and detecting the amount of movement of the shadow-picture-like diffraction pattern with the light sensor, the amount of movement, or displacement, of the object can be known. If necessary, the detected amount of movement may be differentiated to determine the speed of movement or acceleration of the object.

The movement of the object transverse to the illuminating light is effected such that the minimum distance between the spot light source and the object will be kept substantially constant. The direction in which the object is moved is other than the direction normal to the periodically varying direction in which the optical property of the object periodically varies in the uniformly periodic structure, and may generally be parallel or substantially parallel to the periodically varying direction.

To generate the shadow-picture-like diffraction pattern at the position of the light sensor means to position the light sensor on the plane on which the shadow-picture-like diffraction pattern is generated, and to locate the light sensor on the plane on which the pattern is generated or to adjust preset conditions for selecting the position of the pattern-generating plane in alignment with the position of the light sensor.

The method of measuring the amount of movement of an object, thus arranged as described above, can quite easily and highly accurately measure the amount of movement, or displacement, of an object having a uniformly periodic structure.

The above and other objects, features and advantages of the present invention will become more apparent from the following description when taken in conjunction with the accompanying drawings.

DESCRIPTION OF THE PREFERRED EMBODIMENTS

Figure 4:
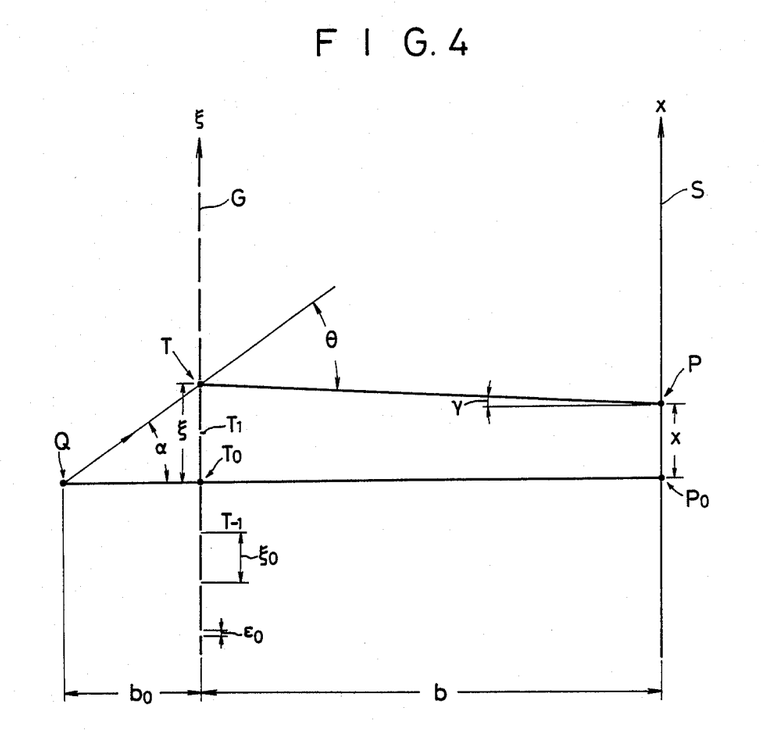
FIG. 4 is a view illustrating the principles of the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 4 shows a model of a spot light source, an object having a uniformly periodic structure, and a plane on which a shadow-picture-like diffraction pattern is generated by light emitted from the spot light source and transmitted through the object.

The spot light source is denoted at Q in FIG. 4. The object of uniformly periodic structure comprises a diffraction grating G. The plane on which the shadow-picture-like diffraction pattern is generated corresponds to a screen S. The diffraction grating G has a multiplicity of slits having a longitudinal direction normal to the sheet of FIG. 4.

Each of the slits of the diffraction grating G has a width $\xi_0$, and the diffraction grating G has a slit spacing or pitch $\xi_0$ which corresponds to the period of the uniformly periodic structure. The diffraction grating G extends on and along a $\xi$ axis, and the screen S extends on and along an x axis.

A line extending from the spot light source Q and normal to the diffraction grating G crosses the diffraction grating G at a point $T_0$ and also crosses the screen S at a point $P_0$. These points $T_0$, $P_0$ serve as the origins of the $\xi$, x axes, respectively.

The distance between the spot light source Q and the diffraction grating G is indicated by $b_0$, whereas the distance between the diffraction grating G and the screen S is indicated by b.

When the spot light source Q emits light to illuminate the diffraction grating G, the light from the spot light source Q is propagated as a spherical wave and reaches the diffraction grating G. From each slit of the diffraction grating G, there is generated a secondary wave which is propagated toward the screen S.

The wave quantity u(p) at a point P on the screen S is given as the sum of the wave quantities of the secondary waves from the respective slits of the diffraction grating G. It is known that this sum can be given by the following integral (see, for example, page 244, "Wave optics" written by Hiroshi Kubota):

$$u(p) = \frac{u_0}{i\lambda \bar{f}} \int \cos\theta \cdot \exp(ik\beta) d\sigma \quad (1)$$

where $\theta$ represents the angle formed between a direction normal to the spherical wave at a slit T and a line segment $\overline{TP}$ as shown in FIG. 4. $\cos\theta$ is called an inclination factor.

In the equation (1), $u_0$ indicates the wave quantity of light which would directly reach the point P from the spot light source Q if it were not for the diffraction grating G. $\beta$ indicates the difference between the length $(b_0+b)$ of an optical path $\overline{QT_0P_0}$ and the length of an optical path QTP, $d\sigma$ indicates a minute area at the slit T, $\lambda$ indicates the wavelength of a light, k indicates the wavenumber $(=2\pi/\lambda)$, and i indicates the imaginary unit. $\bar{f}$ represents a parameter having a distance dimension and defined by:

$$\frac{1}{\bar{f}} = \frac{1}{b_0} + \frac{1}{b} \quad (2)$$

In carrying out a method of the present invention, the condition $b > b_0 > > \xi_0$ is met. Under this condition, the angle $\theta$ is substantially zero, and the inclination factor can be $\cos\theta \approx 1$.

The difference $\beta$ between the lengths of the optical paths may be expressed, using angles $\alpha$, $\gamma$ shown in FIG. 4, as follows:

$$\begin{aligned}\beta &= (\overline{QT} - b_0) + (\overline{TP} - b) \\ &= b_0\left(\frac{1}{\cos\alpha} - 1\right) + b\left(\frac{1}{\cos\gamma} - 1\right)\end{aligned} \quad (3)$$

Assuming that the $\xi$ coordinate of the slit T is $\xi$, $$\cos\alpha = \frac{b_0}{\sqrt{b_0^2 + \xi^2}} = \frac{1}{\left\{1 + \left(\frac{\xi}{b_0}\right)^2\right\}^{\frac{1}{2}}}$$

$$\cos\gamma = \frac{b}{\sqrt{b^2 + (\xi - x)^2}} = \frac{1}{\left\{1 + \frac{(\xi - x)^2}{b^2}\right\}^{\frac{1}{2}}}$$

Using these equations, the equation (3) can be rewritten as follows:

$$\beta = b_0\left[\left\{1 + \left(\frac{\xi}{b_0}\right)^2\right\}^{\frac{1}{2}} - 1\right] + b\left[\left\{1 + \frac{(\xi - x)^2}{b^2}\right\}^{\frac{1}{2}} - 1\right]$$

In view of the fact that $\xi/b_0$, $(\xi-x)/b >> 1$, the equation (3) can be rewritten by way of approximation as:

$$\beta \approx b_0\left[1 + \frac{1}{2}\frac{\xi^2}{b_0^2} - 1\right] + \quad (4)$$

-continued $$b\left[1 + \frac{1}{b^2}(\xi - x)^2 - 1\right] = \frac{\xi^2}{2b_0} + \frac{(\xi - x)^2}{2b}$$

By introducing a new parameter $\bar{x}$ expressed by:

$$\bar{x} \equiv \frac{f}{b} x = \frac{b_0}{b - b_0} x$$

the equation (4) can be rewritten as follows:

$$\beta \approx \frac{x^2}{2(b + b_0)} + \frac{1}{2f}(\xi - \bar{x})^2 \quad (5)$$

Under the condition $\cos \simeq 1$, the equation (1) can be rewritten using the equation (5) as follows:

$$u(p) = \frac{u_0}{i\lambda \bar{f}} \exp\left\{\frac{ikx^2}{2(b + b_0)}\right\} \cdot \int \exp ik \frac{(\xi - \bar{x})}{2\bar{f}} d\xi \quad (1A)$$

Assuming that $\xi$ is a multiple of the pitch $\xi_0$, i.e., $n\xi_0$, and the slit width $\epsilon_0$ is expressed by $\epsilon_0 < < \xi_0$, the integral can be replaced with the sum:

$$u(p) = \frac{u_0}{i\lambda \bar{f}}\left(\frac{\epsilon_0}{\xi_0}\right) \exp\left\{\frac{ikx^2}{2(b_0 + b)}\right\} \quad (1B)$$

$$\sum_{n=-n_0}^{n_0} \exp\left\{i\frac{2\pi}{\lambda} \frac{(n\xi_0 - \bar{x})^2}{2\bar{f}}\right\}$$

While the integer n ranges from $-n_0$ to $n_0$, it may range from $-n_1$ to $n_2$. Since $x^2/2(b_0+b) \simeq 0$ under $\cos \simeq 1$, the above equation (1B) can be approximated as follows:

$$u(p) \simeq \frac{u_0}{i\lambda \bar{f}}\left(\frac{\epsilon_0}{\xi_0}\right) \cdot \sum_{n=-n_0}^{n_0} \exp\left(i\frac{2\pi}{\lambda} \frac{(n\xi_0 - \bar{x})^2}{2\bar{f}}\right) \quad (1C)$$

$$= \frac{u_0}{i\lambda \bar{f}}\left(\frac{\epsilon_0}{\xi_0}\right) \cdot \sum_{n=-n_0}^{n_0} \exp\left(\frac{i\pi}{\lambda} \frac{(n\xi_0 - \bar{x})^2}{\bar{f}}\right)$$

$$\frac{\bar{x}}{\xi_0} = m, K = \frac{u_0}{i\lambda \bar{f}}\left(\frac{\epsilon_0}{\xi_0}\right) = \text{a constant,}$$

then the equation (1C) is expressed by:

$$u(p) = K \sum_{n=-n_0}^{n_0} \exp\left\{i\frac{\pi}{\lambda} \cdot \frac{\xi_0^2}{\bar{f}}(n - m)^2\right\} \quad (1D)$$

$$\frac{\pi \xi_0^2}{\lambda \bar{f}} = \phi_0$$

then the equation (1D) is expressed by:

$$u(p) = K \cdot \sum_{n=-n_0}^{n_0} \exp\{i\phi_0(n - m)^2\} \quad (6)$$

where the argument n is the number of a slit as counted from the position of $T_0$ in FIG. 4, and is 0, $\pm 1$, $\pm 2$, ..

.. $n_0$ is the number of the outermost slit illuminated by the divergent light.

Calculation of $u(p)$ according to the equation (6) indicates that the intensity of light at the point P on the screen S is proportional to $|u(p)|^2$. Therefore, $|u(p)|^2$ as a function of x gives a diffraction pattern.

Now, $u(p)$ and $|u(p)|^2$ at a particular position on the screen S will be determined. If, for this purpose, $$\phi_n = \phi_0(n-m)^2$$

then the equation (6) is given as:

$$u(p) = K \cdot \sum_{n=-n_0}^{n_0} \exp\{i\phi_n\} \quad (6A)$$

Inasmuch as $\exp\{i\phi_n\}$ in the equation (6A) represents a unit vector of the argument $\phi_n$ in a complex plane, the equation (6A) can be determined as the sum of vectors in the complex plane.

First, the case in which $m=0$ will be considered. Since $m=\bar{x}/\xi_0$, $m=0$ means $\bar{x}=0$, and since $\bar{x}=(\bar{f}/b)x$, $\bar{x}=0$ means $x=0$.

Therefore, to determine $u(p)$, $|u(p)|^2$ with $m=0$ means to determine the wave quantity $u(p_0)$ at the point $P_0$ in FIG. 4 and its relative intensity of light.

At $m=0$, $\phi_n = \phi_0 n^2$ in the equation (6).

If the value of $\phi_0 = (\pi \epsilon_0^2)/\lambda \bar{f}$ is regarded as 2, for example, then $\phi_n = 2\pi \cdot n^2$ according to the value of n, and hence the unit vectors $\exp\{i\phi_n\}$ are all in the same direction and lie on a real axis. The light intensity $|u(p)|^2$ obtained from $u(p_0)$ at this time is standardized as relative intensity 1.

Next, if $\phi_0 = \pi/2$, then $\phi_n = \pi/2 \cdot n^2$. Therefore, the unit vectors $\exp\{i\phi_n\}$ become unit vectors oriented in a positive direction on the real axis with respect to $n=0$ and an even number n, and unit vectors oriented in a positive direction on an imaginary axis with respect to an odd number n.

Consequently, the term indicative of the sum in the equation (6A) represents a quantity in proportion to $1/\sqrt{2}$, and the relative intensity obtained by standardizing $|u(p_0)|^2$ is expressed by:

$$\frac{1}{2}\left\{=\left(\frac{1}{\sqrt{2}}\right)^2\right\}$$

The relative intensities obtained by standardizing $[u(p_0)]^2$ for $\phi_0 = 2\pi, \pi, \pi/2, \pi/4, \pi/6, \pi/8$ are given in Table 1 below:

TABLE 1

| $\phi_0$ | $2\pi$ | $\pi$ | $\pi/2$ | $\pi/4$ | $\pi/6$ | $\pi/8$ |
|---|---|---|---|---|---|---|
| Relative intensity | 1 | 0 | $(\frac{1}{2})^2$ | $(\frac{1}{2})^2$ | 1/6 | $\frac{1}{8}$ |

Likewise, relative intensities for $\phi_0 = 2\pi, \pi, \pi/2, \pi/4, \pi/6, \pi/8$ when $m=\frac{1}{2}$ are given in Table 2 below:

TABLE 2

| $\phi_0$ | $2\pi$ | $\pi$ | $\pi/2$ | $\pi/4$ | $\pi/6$ | $\pi/8$ |
|---|---|---|---|---|---|---|
| Relative intensity | 1 | 1 | 0 | 0 | 0 | 0 |

Since $m = \bar{x}/\xi_0$, $m = \frac{1}{2}$ means $\bar{x} = \frac{1}{2} \cdot \xi_0$.
In view of $$\overline{x} = \frac{b_0}{b + b_0} x,$$

the position on the screen S for which the relative intensity given in Table 2 is calculated is an intermediate point between the point P₀ and the position of the shadow produced on the screen S of a slit adjacent to T₀ by light from the spot light source Q. At this time, $$\phi_n = \phi_0 \left( n - \frac{1}{2} \right)^2$$

One of diffraction patterns $|u(p)|^2$ calculated by the equation (6A) at the time $\phi_0$ is of a particular value and gives a shadow-picture-like diffracton pattern.

Figure 5:
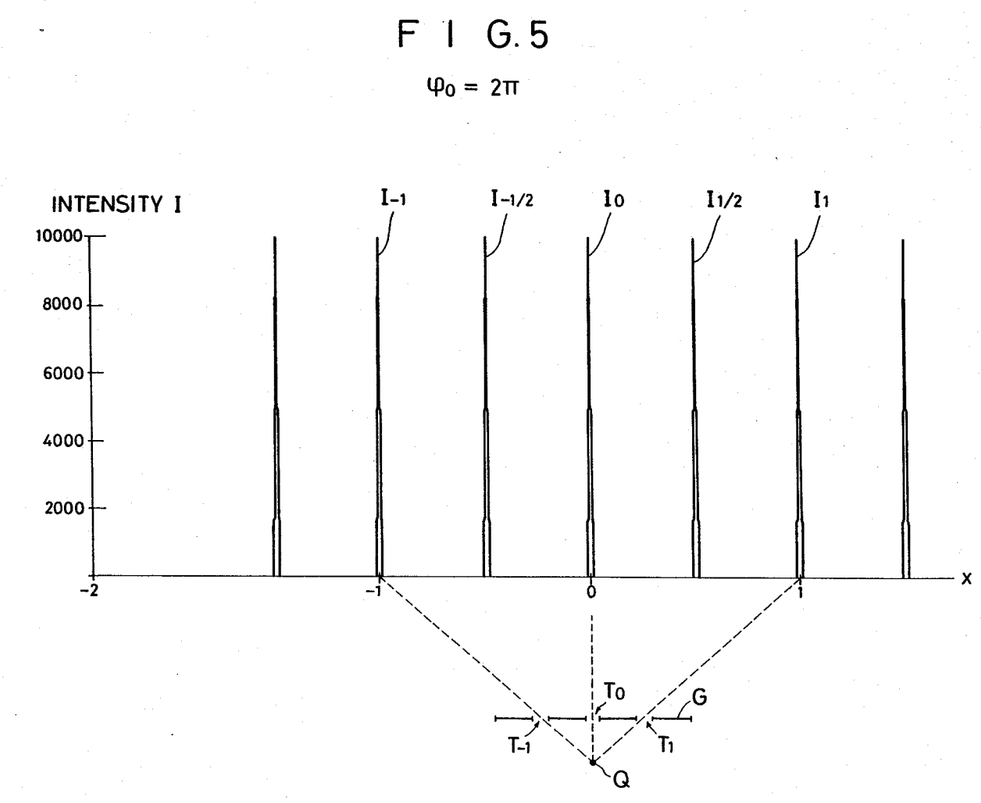
FIGS. 5, 6, 7, 8, 9, 10, 11, 12, 13, 14 and 15 are diagrams showing examples of shadow-picture-like diffraction patterns.

FIGS. 5 through 15 show eleven examples of shadow-picture-like diffraction patterns. In each of the diagrams showing shadow-picture-like diffraction patterns, the vertical axis indicates the light intensity I and the horizontal axis x represents a position on the plane on which the shadow-picture-like diffraction pattern is formed. The point 0 on the x-axis corresponds to the point P₀ as shown in FIG. 4, and the points ±1 correspond to screen areas which can be viewed from the spot light source Q through slits $T_1$, $T_{-1}$ adjacent to the slit $T_0$ of the diffraction grating G as shown in FIG. 5.

As is apparent from FIGS. 5 through 15, the shadow-picture-like diffraction patterns themselves have a uniformly periodic structure. When the diffraction grating G is moved in the axis ξ in FIG. 4, the shadow-picture-like diffraction patterns are also moved in the direction x on the screen S, and the speed of movement of the patterns is $(b_0+b)/b_0$ times the speed of movement of the diffraction grating G.

The shadow-picture-like diffraction pattern illustrated in FIG. 5 will be described, by way of example, in relation to the aforesaid calculations.

The shadow-picture-like diffraction pattern shown in FIG. 5 is given under the condition $\phi_0 = 2\pi$. A line-shaped image $I_0$ corresponds to the relative intensity 1 at $\phi_0 = 2\pi$ in Table 1 above since it means the light intensity under the condition $\phi_0 = 2\pi$.

Images $I_{\pm \frac{1}{2}}$ correspond to the relative intensity 1 at $\phi_0 = 2\pi$ in Table 2 above since it indicates the light intensity under the condition $\phi_0 = 2\pi$.

Figure 6:
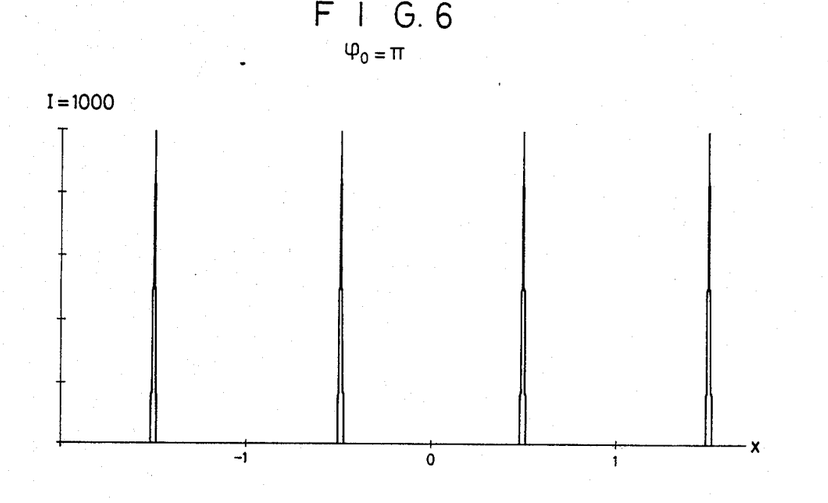

Images $I_0$, $I_{\pm 1}$ correspond to shadow pictures of the slits $T_0$, $T_{\pm 1}$ which are produced by light emitted from the spot light source Q. $\phi_0 = \pi$ for the shadow-picture-like diffraction pattern shown in FIG. 6. Therefore, as can be understood from the relative value 0 in Table 1, no image is formed at the point 0. The shadow-picture-like diffraction pattern shown in FIG. 6 is equivalent to a shadow-picture-like diffraction pattern of the slits $T_0$, $T_{\pm 1}$ which has been shifted a half pitch in the direction x.

Figure 7:
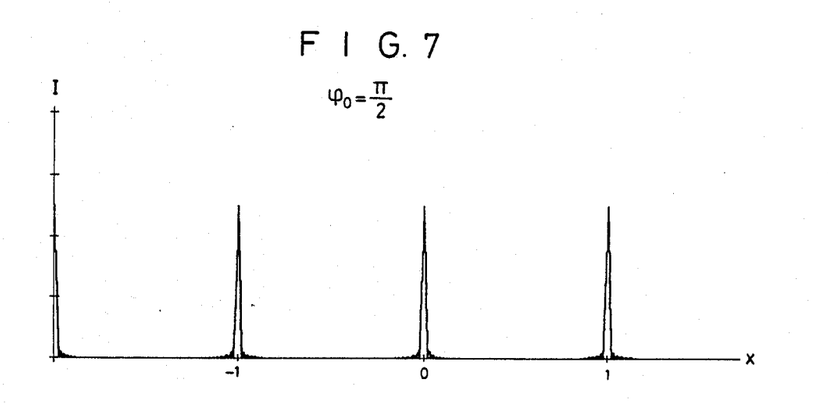
Figure 8:
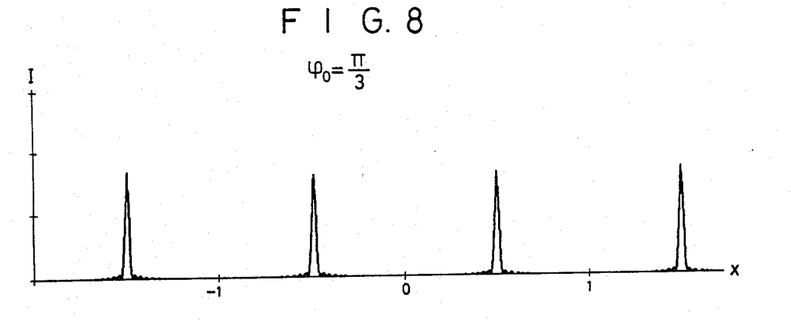
Figure 9:
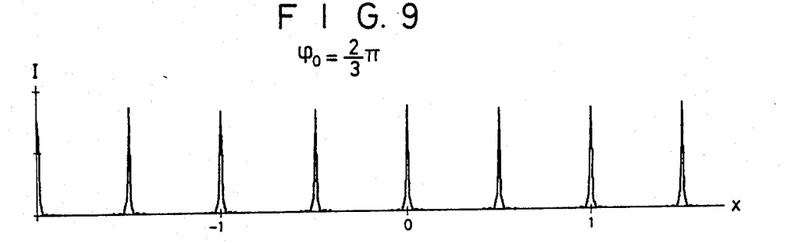
Figure 10:
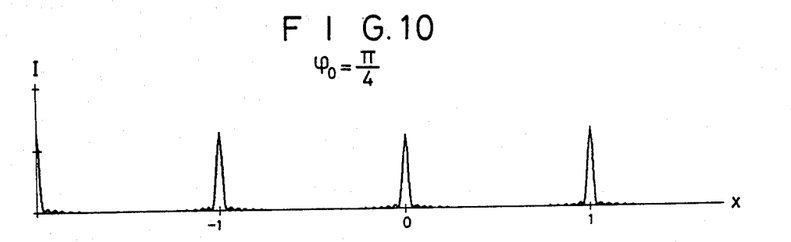
Figure 11:
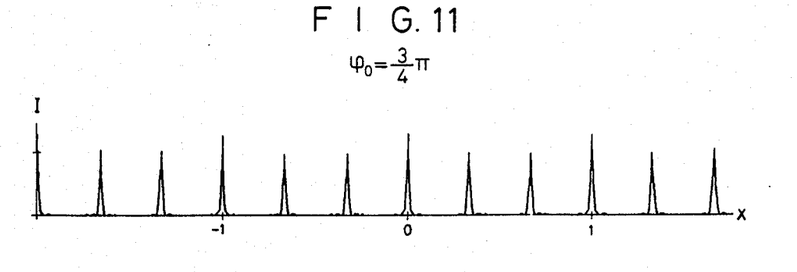
Figure 12:
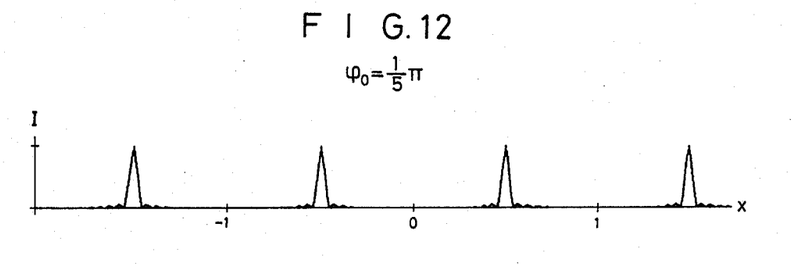
Figure 13:
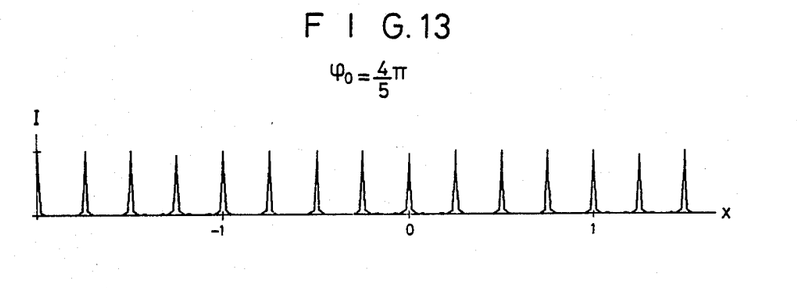
Figure 14:
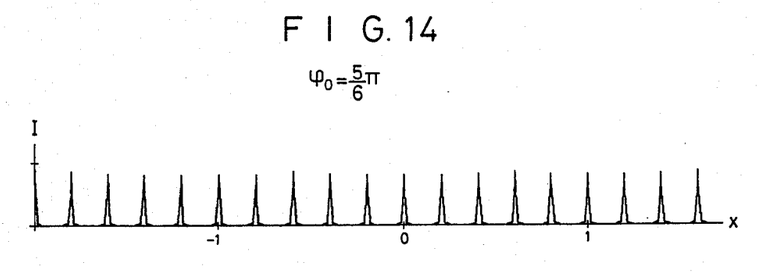

The shadow-picture-like diffraction pattern shown in FIG. 7 is produced under the condition $\phi_0 = \pi/2$. As is clear from the study of FIG. 7, the pattern of FIG. 7 coincides with a full shadow-picture-like pattern produced of the diffraction pattern G by the spot light source Q. Since the diffraction patterns include those which completely coincide with shadow-picture-like diffraction patterns, such diffraction patterns are called shadow-picture-like patterns as described above.

The shadow-picture-like diffraction pattern shown in FIG. 5 will be reviewed again by way of example.

A light sensor is positioned on the screen, i.e., the plane on which the shadow-picture-like diffraction pattern is produced. When the diffraction grating G is moved along the ξ axis (horizontally in FIG. 5), the shadow-picture-like diffraction pattern is also moved along the axis x. Upon detection by the light sensor of the images $I_0$, $I_{\pm \frac{1}{2}}$, and the like, the amount of movement, or displacement, of the shadow-picture-like diffraction pattern can be detected.

The images $I_0$, $I_{\pm \frac{1}{2}}$, $I_{\pm 1}$ are equally spaced apart in the shadow-picture-like diffraction pattern shown in FIG. 5. If the light sensor successively detects the images $I_{-1}$, $I_{-\frac{1}{2}}$, $I_0$, ... in the named order, the diffraction grating G is moved a distance equal to the slit pitch $\xi_0$ (see FIG. 4) between the detection of the image $I_{-1}$ and the detection of the image $I_0$. Since the images $I_{-1}$, $I_{-\frac{1}{2}}$, $I_0$ are equally spaced apart, the amount of movement of the diffraction grating can be detected to an accuracy of $\xi_0/2$ by detection by the light sensor of the image $I_{-\frac{1}{2}}$ between the images $I_{-1}$, $I_0$.

Figure 15:
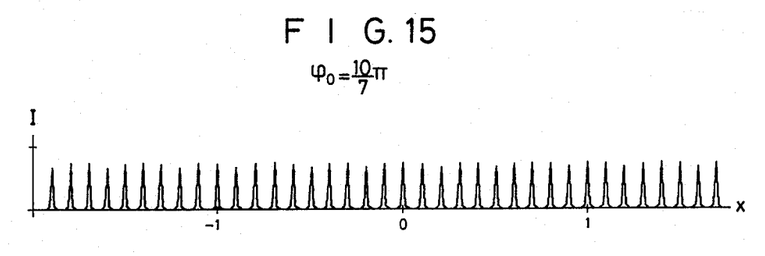

Depending on a shadow-picture-like diffraction pattern employed, therefore, the amount of movement of an object, which is smaller than the pitch of the uniformly periodic structure of the object, can be detected. For example, when a shadow-picture-like diffraction pattern is used as shown in FIG. 15 in which $\phi_0 = (10/7)\pi$, the amount of movement which is 1/10 of the pitch of the uniformly periodic structure of the object can be accurately detected.

A shadow-picture-like diffraction pattern is a special or unique pattern which is produced when $\phi_0$, i.e., $\pi \xi_0^2 / \lambda \bar{f}$ have certain values such as $2\pi$, $\pi$, $\pi/2$, ..., $(10/7)\pi$, for example. Stated otherwise, in order to generate a shadow-picture-like diffraction pattern, it is necessary for $\pi \xi_0^2 / \lambda \bar{f}$ to have a value of $(k/l)\pi$ (k/l is an irreducible fraction).

In the quantity $\pi \xi_0^2 / \lambda \bar{f}$, $\xi_0$ indicates the pitch of the uniformly periodic structure of the object and is uniquely determined depending on the structure. λ indicates the wavelength of the light emitted from the spot light source and is dependent on the spot light source. $\bar{f}$ represents $b_0 b/(b_0+b)$ and includes the positional relationship relating to the spot light source, the object, and the light sensor (the plane on which a shadow-picture-like diffraction pattern is produced). Therefore, where the condition $\pi \xi_0^2 / \lambda \bar{f} = 2\pi$ is determined in order to produce the shadow-picture-like diffraction pattern as shown in FIG. 5, λ and $\xi_0$ are determined once the spot light source and the object are determined, so that $\bar{f}$ is uniquely determined as $\bar{f} = \xi_0^2 / 2\lambda$.

Therefore, in order to reduce the present invention to practice, the spot light source and the light sensor are positionally adjusted with respect to the object so that $\bar{f}$ will meet the above value.

Of course, the pitch of the uniformly periodic structure of the object and the spot light source may be selected after the positional relationship of the spot light source, the object, and the light sensor has been determined, as the case may be.

It has experimentally been confirmed that shadow-picture-like diffraction patterns are highly stable according to the present invention. Insofar as the distance $b_0$ between the spot light source and the object remains constant, since $b \gg b_0$, a shadow-picture-like diffraction pattern is substantially not affected even if the position of the plane on which the pattern is generated, i.e., b, is varied more or less.

For example, assuming that the distance $b_0$ is 10 mm and the distance b is 90 mm, the shadow-picture-like diffraction pattern is not varied at all even if the distance b is varied ±1 mm.

This is highly advantageous in that the positional relationship between the object and the light sensor is not required to be highly accurate.

Arrangements according to different embodiments will be described with reference to FIGS. 1 through 3.

Figure 1:
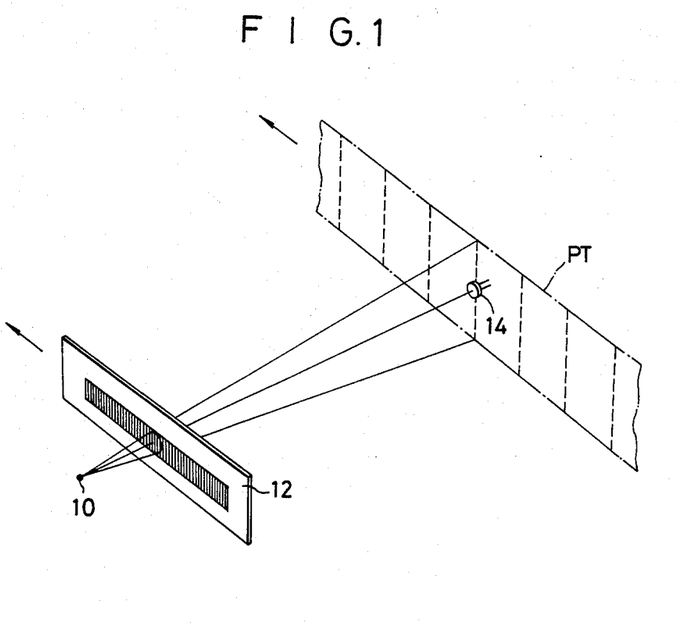
FIG. 1 is a fragmentary perspective view explaining a method according to an embodiment of the present invention.

FIG. 1 shows a spot light source 10, a scale 12 of a linear encoder which has a uniformly periodic structure, and a light sensor 14.

The scale 12 which can transmit light therethrough is illuminated with divergent light emitted from the spot light source 10, and light that has passed through the scale 12 produces a shadow-picture-like diffraction pattern PT on a plane in which the light sensor 14 is placed. As the scale 12 is moved in the direction of the arrow, the shadow-picture-like diffraction pattern PT is also moved in the direction of the arrow. The amount of movement of the scale 12 can be found by detecting the amount of movement of the shadow-picture-like diffraction pattern PT with the light sensor 14.

The spot light source 10 comprises a masked semiconductor laser which is fabricated as follows:

An electric insulating layer of SiO is deposited to a thickness of 1500 angstroms by vacuum evaporation on the light-emitting surface of a ternary semiconductor laser of GaAs and AlGaAs (allowable output: 5 mW, rated output: 3 mW, emission wavelength: 780 nm). A masking layer of carbon is formed to a thickness of 800 angstroms by sputtering on the electric insulating layer. The semiconductor laser is then energized with the power of 5 mW to define a pinhole of a size of 0.2 micrometer×0.6 micrometer in the masking layer of carbon. A light output through the pinhole is 1.7 mW.

The pitch or slit-to-slit width of the uniformly periodic structure of the scale 12 is 0.08 mm. The pinhole is sufficiently small with respect to this pitch, and hence the masked semiconductor laser can be well regarded as a spot light source with respect to the uniformly periodic structure of the scale 12. The shadow-picture-like diffraction pattern of the scale 12 which is produced by the spot light source 10 is selected to be similar to that which is shown in FIG. 5.

The distance between the spot light source 10 and the scale 12 is 5 mm. Since $\xi_0 = 0.08$ mm and $\lambda = 0.00078$ mm in $\pi \xi_0^2 / \lambda \bar{f} = 2\pi$, $\bar{f} = 0.08^2/(2 \times 0.00078) = 0.0064/0.00156 = 4.10$. Since $\bar{f} = 4.10$ and $b_0 = 5$ mm in $\bar{f} = b_0 b/(b_0 + b)$, $b = 4.10 \times 5/(5 - 4.10) = 22.8$ mm.

Therefore, the plane on which the shadow-picture-like diffraction pattern PT is generated is positioned on one side of the scale 12 which is opposite to the spot light source 10, and is spaced 22.8 mm from the scale 12. By locating the light sensor 14 in the plane on which the pattern PT is formed and detecting the amount of movement of the shadow-picture-like diffraction pattern PT, the amount of movement of the scale 12 could be detected in units of 0.04 mm.

Figure 2:
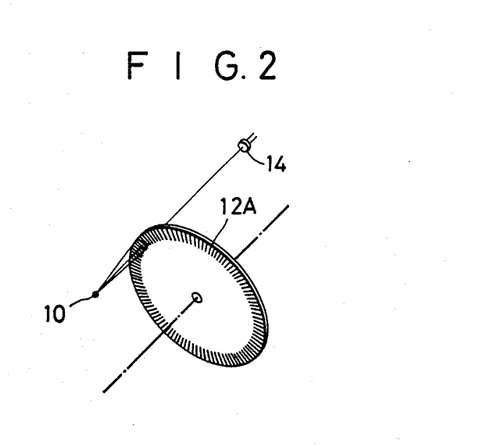
FIG. 2 is a fragmentary perspective view explaining a method according to another embodiment of the present invention.
Figure 3:
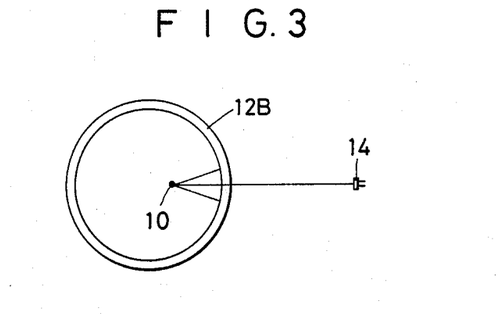
FIG. 3 is an elevational view explanatory of a method according to still another embodiment of the present invention.

FIGS. 2 and 3 show different arrangements of other embodiments. Those parts in FIGS. 2 and 3 which are identical to those shown in FIG. 1 are denoted by identical reference numerals. In FIG. 2, an object to be measured is a light-transmissive code disk of a rotary encoder. In FIG. 3, an object to be measured is a hollow cylinder having a uniformly periodic structure with its transmissivity being uniformly periodically variable in a circumferential, or maximum-curvature, direction.

In each of FIGS. 1, 2, and 3, the light sensor comprises a PIN photosensor disposed on the central optical axis of the divergent light emitted from the spot light source 10 and traveling through the object 12, 12A, 12B.

While in the above description a shadow-picture-like diffraction pattern is produced by light that has passed through an object, it may be generated by light that has been reflected by an object for measuring the amount of movement of the object. A concave or convex lens may be disposed between the spot light source and the object for adjusting or changing the distance between the spot light source and the object.

Although certain preferred embodiments have been shown and described, it should be understood that many changes and modifications may be made therein without departing from the scope of the appended claims.

We claim as our invention:

1. A method of measuring the amount of movement of an object having a uniformly periodic structure, comprising the steps of:
    applying divergent light emitted from a coherent spot light source to the object;
    positionally adjusting the spot light source, the object, and a light sensor to produce an enlarged shadow-picture-like diffraction pattern of the uniformly periodic structure with light passing through or reflected by said object, at a position in which said light sensor is disposed; and
    detecting the amount of movement of said shadow-picture-like diffraction pattern with said light sensor upon movement of said object in a direction transverse to the divergent light, for thereby measuring the amount of movement of said object.

2. A method according to claim 1, wherein said object comprises a scale of a linear encoder.

3. A method according to claim 1, wherein said object cmprises a code disk of a rotary encoder.

4. A method according to claim 1, wherein said object comprises an optical disk.

5. A method according to claim 1, wherein said spot light source comprises collected light produced by converging light from a laser light source.

6. A method according to claim 1, wherein said spot light source comprises a semiconductor laser.

7. A method according to claim 1, wherein said spot light source comprises a semiconductor laser having a pinhole defined in a light-emitting surface thereof.

8. A method according to claim 7, wherein said semiconductor laser comprises a masked semiconductor laser.

9. A method according to claim 1, wherein the positional relationship between the spot light source, the object, and the light sensor is defined by $\bar{f} = \xi_0^2/2\lambda$, where $\xi_0$ is the distance equal to the slit pitch, $\lambda$ is the wavelength of the spotlight source and $\bar{f} = b_0 b/(b_0 + b)$ where $b_0$ is the distance between the spot light source and the object and b is the distance between the object and the light sensor.

* * * * *